(12) United States Patent
Berglund et al.

(10) Patent No.: US 8,089,345 B2
(45) Date of Patent: Jan. 3, 2012

(54) SYSTEM AND METHOD FOR POWER AND DATA DELIVERY ON A MACHINE

(75) Inventors: Darrel W. Berglund, Peoria, IL (US); David C. Freeman, Mapleton, IL (US); Daniel K. Dunn, III, Dunlap, IL (US); John W. Crayton, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 161 days.

(21) Appl. No.: 11/800,739

(22) Filed: May 7, 2007

(65) Prior Publication Data

US 2007/0210898 A1 Sep. 13, 2007

Related U.S. Application Data

(63) Continuation-in-part of application No. 11/257,571, filed on Oct. 25, 2005.

(60) Provisional application No. 60/626,813, filed on Nov. 10, 2004.

(51) Int. Cl.
*G09F 25/00* (2006.01)
(52) U.S. Cl. .................... 340/286.01; 340/506; 340/517
(58) Field of Classification Search .................. 340/506, 340/517, 521, 524, 525, 3.1, 825.36, 825.49
See application file for complete search history.

(56) References Cited

U.S. PATENT DOCUMENTS

| | | | |
|---|---|---|---|
| 4,463,341 A | 7/1984 | Iwasaki | |
| 4,933,668 A | 6/1990 | Oyer et al. | |
| 4,956,561 A | 9/1990 | Tamer | |
| 5,041,012 A | 8/1991 | Caprio | |
| 5,148,144 A | 9/1992 | Sutterlin et al. | |
| 5,305,316 A | 4/1994 | Yoshida et al. | |
| 5,359,881 A * | 11/1994 | Kalotay et al. | 73/54.06 |
| 5,400,246 A * | 3/1995 | Wilson et al. | 700/17 |
| 5,585,777 A * | 12/1996 | Johnson et al. | 375/219 |
| 5,589,813 A | 12/1996 | Nielsen | |
| 5,626,489 A | 5/1997 | Marshall et al. | |
| 5,745,027 A | 4/1998 | Malville | |
| 5,859,584 A | 1/1999 | Counsell et al. | |
| 5,886,619 A | 3/1999 | Takasan et al. | |
| 6,034,988 A | 3/2000 | VanderMey et al. | |
| 6,188,314 B1 | 2/2001 | Wallace et al. | |
| 6,198,244 B1 | 3/2001 | Hayden et al. | |
| 6,229,433 B1 | 5/2001 | Rye et al. | |
| 6,326,704 B1 | 12/2001 | Breed et al. | |
| 6,373,377 B1 | 4/2002 | Sacca et al. | |
| 6,512,307 B1 | 1/2003 | Ilg | |
| 6,552,443 B1 | 4/2003 | Johnke et al. | |
| 6,563,419 B1 | 5/2003 | Herz et al. | |
| 6,577,230 B1 | 6/2003 | Wendt et al. | |

(Continued)

FOREIGN PATENT DOCUMENTS

EP 1372270 12/2003

(Continued)

*Primary Examiner* — Daryl Pope
(74) *Attorney, Agent, or Firm* — Kevin C. Earle

(57) ABSTRACT

A power and data delivery system for a machine. The system includes a conductor located throughout at least a portion of the machine for delivering power, a plurality of nodes, each connected to the conductor at a respective location, and a plurality of devices, each connected to a corresponding node. At least one node controls the delivery of power and data by way of a message containing a unique identifier for that one node.

20 Claims, 13 Drawing Sheets

U.S. PATENT DOCUMENTS

| | | |
|---|---|---|
| 7,262,693 B2 * | 8/2007 | Karschnia et al. ............ 340/508 |
| 2002/0113492 A1 | 8/2002 | Sakamoto et al. |
| 2003/0045970 A1 | 3/2003 | Maryanka |
| 2003/0067910 A1 | 4/2003 | Razazian et al. |
| 2003/0088706 A1 | 5/2003 | Chan et al. |
| 2003/0156012 A1 | 8/2003 | Omidi et al. |
| 2003/0158640 A1 | 8/2003 | Pillar et al. |
| 2003/0184433 A1 | 10/2003 | Zalitzky et al. |
| 2003/0215032 A1 | 11/2003 | Langalis et al. |
| 2004/0087214 A1 | 5/2004 | Cho |
| 2004/0131189 A1 | 7/2004 | Lawton et al. |

FOREIGN PATENT DOCUMENTS

WO     WO 95/27344     10/1995

* cited by examiner

Fig_2_

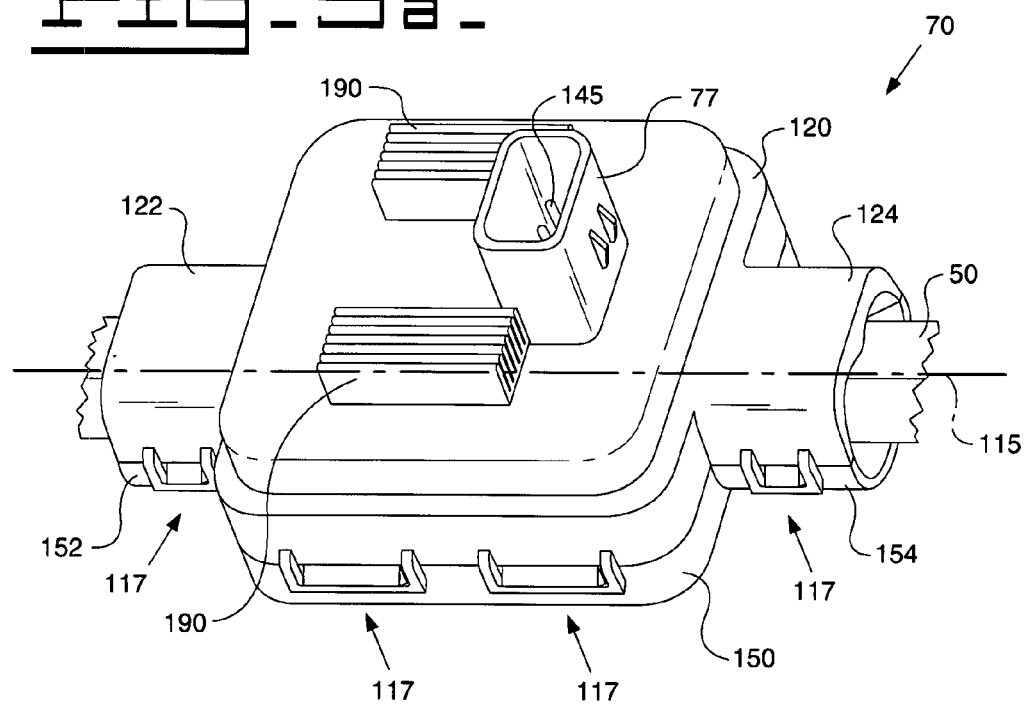
Fig-5a-
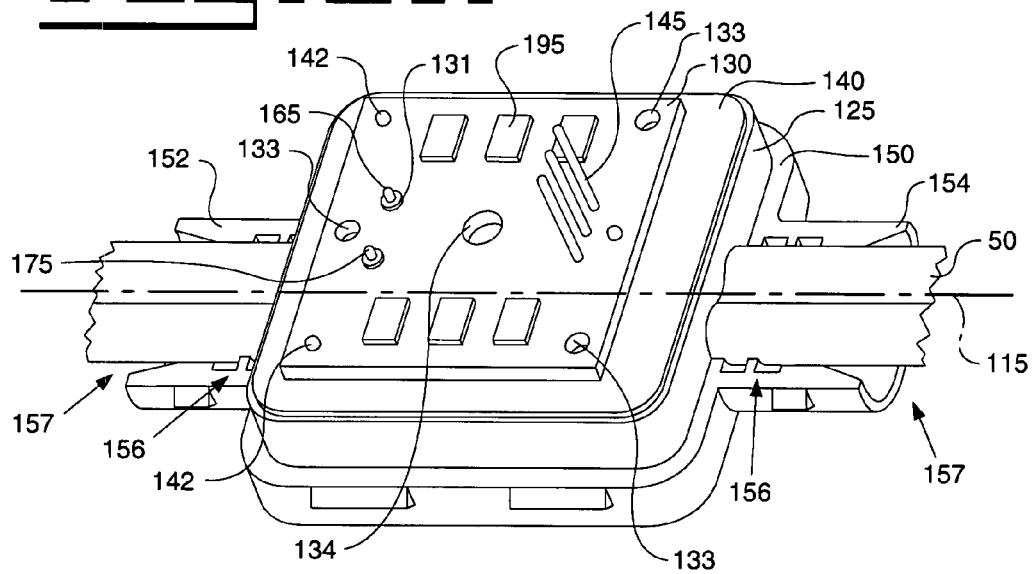
Fig-5b-

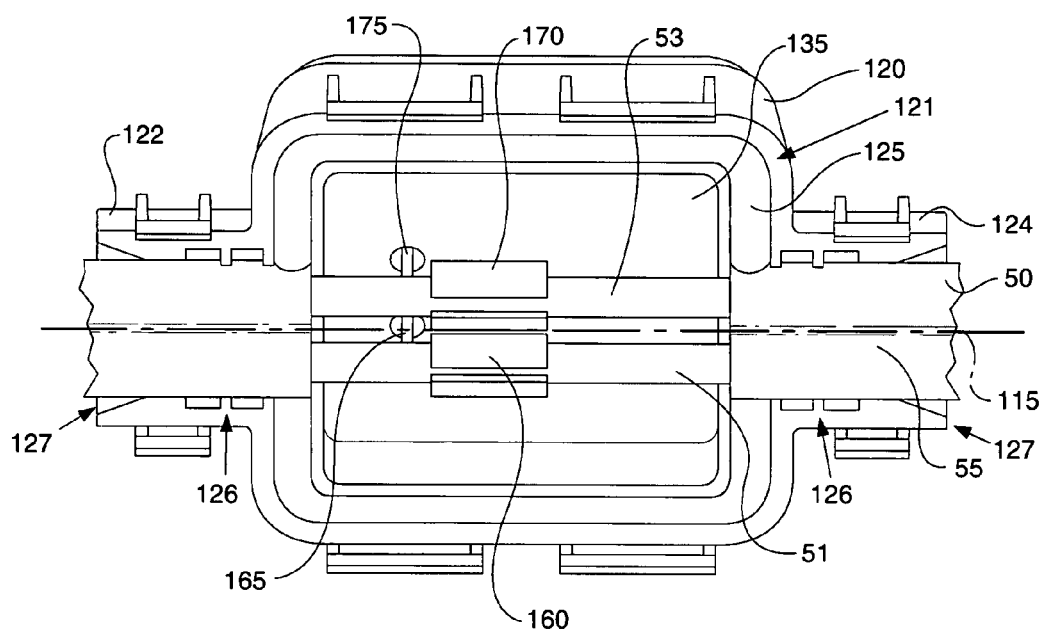
Fig_5e_

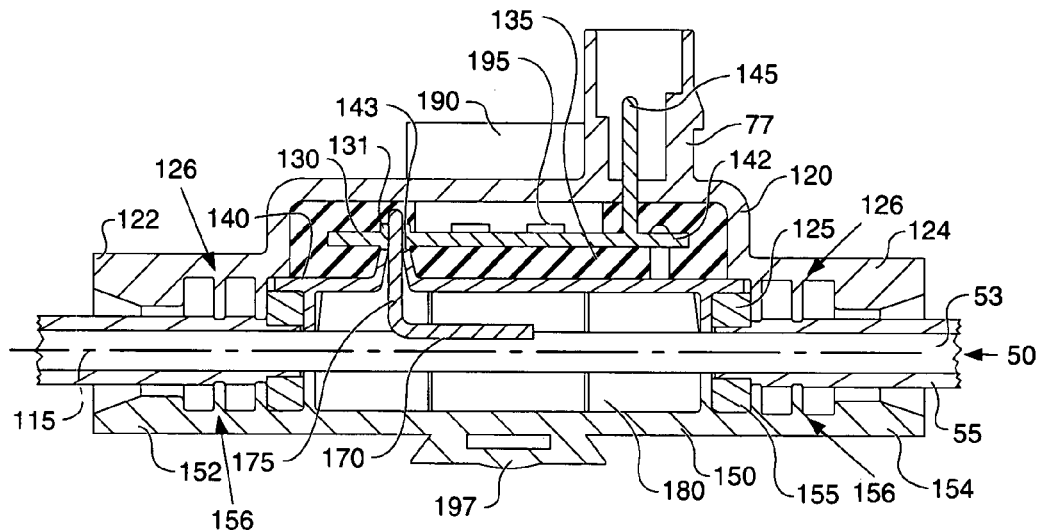
Fig_5f_
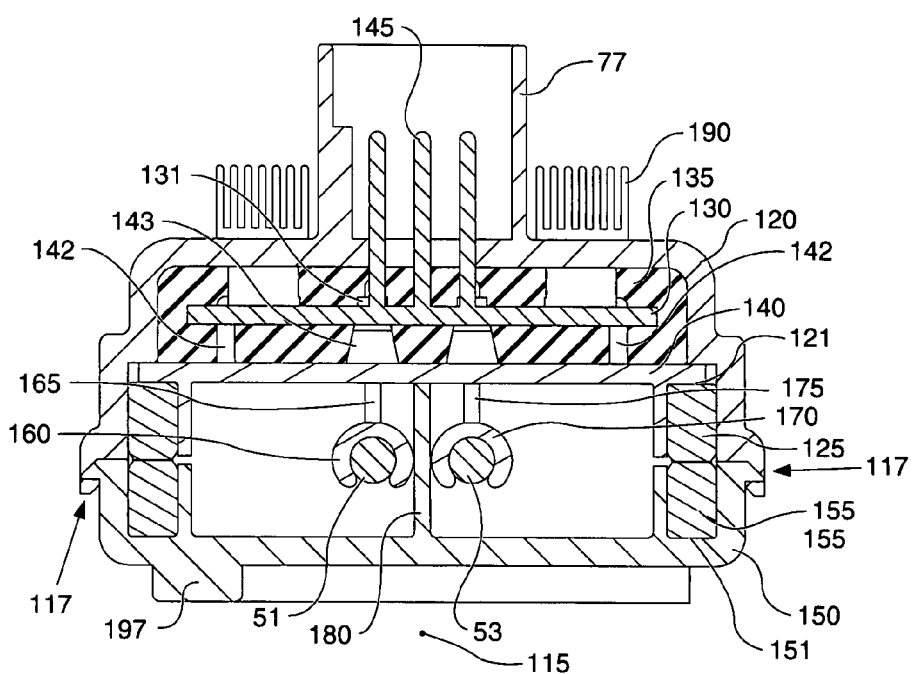
Fig_5g_

Fig_8_

SYSTEM AND METHOD FOR POWER AND DATA DELIVERY ON A MACHINE

RELATION TO OTHER PATENT

This application is a continuation-in-part of patent application Ser. No. 11/257,571, filed on Oct. 25, 2005, which claims priority to provisional application No. 60/626,813, filed on Nov. 10, 2004.

TECHNICAL FIELD

The present invention relates generally to a system and method for distributed communications on machines and more particularly to a system and method for data and power delivery over the same conductors.

BACKGROUND

Machines are used to perform a wide variety of job functions, and may be mobile or stationary. For example, a typical machine is shown in FIG. 1 as a wheel loader, and is used for many earthworking and construction tasks. Other types of machines may include trucks, automobiles, marine craft, aircraft, dozers, graders, excavators, tractor trailers, trains, stationary electric power generators, and many others.

Typically, machines are powered, controlled and monitored using electric and electronic technology, which involves the use of electrical conductors to supply power and data to various components and locations. Traditionally, power and data are delivered on separate conductors. In machines such as this, an operator may control devices from a central location with data routed through independent data conductors dedicated to each device. Similarly, the power for any of these machines would normally originate at a power source and connect to a central location, typically a fuse block, for independent distribution on power conductors to locations throughout the machine.

In current systems, two or more conductors are required for each device. The total number of conductors required increases proportionally to the number of devices used by the machine, and the number is ever increasing. Future machines will require even more devices than do present machines. To minimize assembly problems on current machines, the conductors are bundled into complex and cumbersome wiring harnesses. With a larger number of conductors, the wiring harnesses become proportionally larger and proportionally harder to route around the machine. The cost and weight of the wiring harnesses also increases proportionally and the time to troubleshoot increases exponentially. For ease of assembly, harnesses use connectors. Large harnesses require large and expensive connectors. The addition of even one new device may require harness replacement or modification. Even when the desired conductors for service or modification are found, they may not be in a convenient location to perform the needed work to connect to the new device. Unfortunately, because of the ever-increasing percentage of machine functions being performed electronically, the problems will only continue to multiply.

Multiplexing has been used to try to reduce the number of individual conductors needed for electrical communication. Multiplexing is typically used to send multiple messages on a single pair of signal conductors to separate or independent receivers of electrical data. However, present day techniques of multiplexing groups of electrical functions are only partially solving system complexity problems and are merely creating additional layers of electrical hierarchy rather than reducing complexity of the electrical systems. Although these systems and methods may be adequate for the speed and bandwidth of some of today's electrical functions, speed and capacity become a significant problem as signal activity continues to increase.

Attempts have also been made to use a data communication system where data and power are routed over the same conductors. For example, it is known in motor vehicles to arrange functional devices to communicate with each other through supply conductors connected to the battery of the vehicle by means of a carrier current technique. One such example of a data communication system employing the use of carrier currents is disclosed by U.S. Pat. No. 5,745,027, to Malville. Malville, however, does not disclose features which would enable a combination of power and data delivery throughout a machine. For example, Malville does not disclose smart connectors that connect devices to a wire bus that are configured to communicate and work with other smart connectors. Malville also does not disclose techniques in which smart connectors are readily connected to the bus at any desired location during assembly, maintenance or upgrades. Furthermore, Malville does not disclose techniques for delivering large amounts of data over a combined power and data delivery bus that accounts for and compensates for data interference in harsh environments.

In U.S. Pat. No. 5,727,025, Maryanka discloses a system that allows for voice, music, video and data to be transmitted over direct current wires. The system of Maryanka, however, does not disclose the use of smart connectors in that the interface between devices and the direct current wires has no capability to interpret commands and control devices based on decision making. Maryanka's system also does not include techniques for smart connectors being readily connected at any desired locations on the direct current lines.

SUMMARY OF THE INVENTION

It is to be understood that both the foregoing general description and the following detailed description are exemplary and explanatory only and are not restrictive of the invention as claimed.

One aspect of the present invention is directed to a power and data delivery system for a machine. The system comprises a conductor for delivering power on a machine, a plurality of nodes, and a plurality of devices. Each node is connected to the conductor at a respective location along the conductor. Each device is connected to a corresponding node. At least one node controls the delivery of power and data by way of a message containing a unique identifier.

Another aspect of the present invention is directed to a power and data delivery system for a machine. The system comprises a conductor for delivering power on a machine, a plurality of nodes, a plurality of devices, an operator interface, and at least one processor. Each node is connected to the conductor at a respective location along the conductor. At least one device is connected to a corresponding node, the corresponding node for transferring at least one of power and data between the conductor and the at least one connected device. The operator interface is configured to convey a message through the conductor, the message containing a unique identifier for a particular node. The at least one processor is configured to control the delivery of power and data based on the message.

Another aspect of the present invention is directed to a method for controlling devices over a power and data delivery system on a machine. The method comprises establishing data signal communications over a conductor configured to deliver power on a machine, determining the presence of at least one of a plurality of nodes connected to the conductor, determining the presence of at least one device connected to a corresponding one of the plurality of nodes, determining a unique identifier for at least one node, and controlling the delivery of power and data to the node.

BRIEF DESCRIPTION OF THE DRAWINGS

The accompanying drawings, which are incorporated in and constitute a part of this specification, illustrate several exemplary embodiments of the invention and, together with the description, serve to explain the principles of the invention. In the drawings.

FIG. 5a is a perspective view of a smart connector according to another embodiment of the present disclosure;

FIG. 5b is a perspective view of the smart connector in FIG. 5a with a connector top housing removed;

FIG. 5e is a perspective view of the smart connector of FIG. 5a with a connector base housing removed;

FIG. 5f is a cross section diagram of the smart connector of FIG. 5a parallel to the conductor;

FIG. 5g is a cross section diagram of the smart connector of FIG. 5a perpendicular to the conductor;

DETAILED DESCRIPTION

Reference will now be made in detail to embodiments of the invention, examples of which are illustrated in the accompanying drawings. Whenever possible, the same reference numbers will be used throughout the drawings to refer to the same or like parts.

Figure 1:
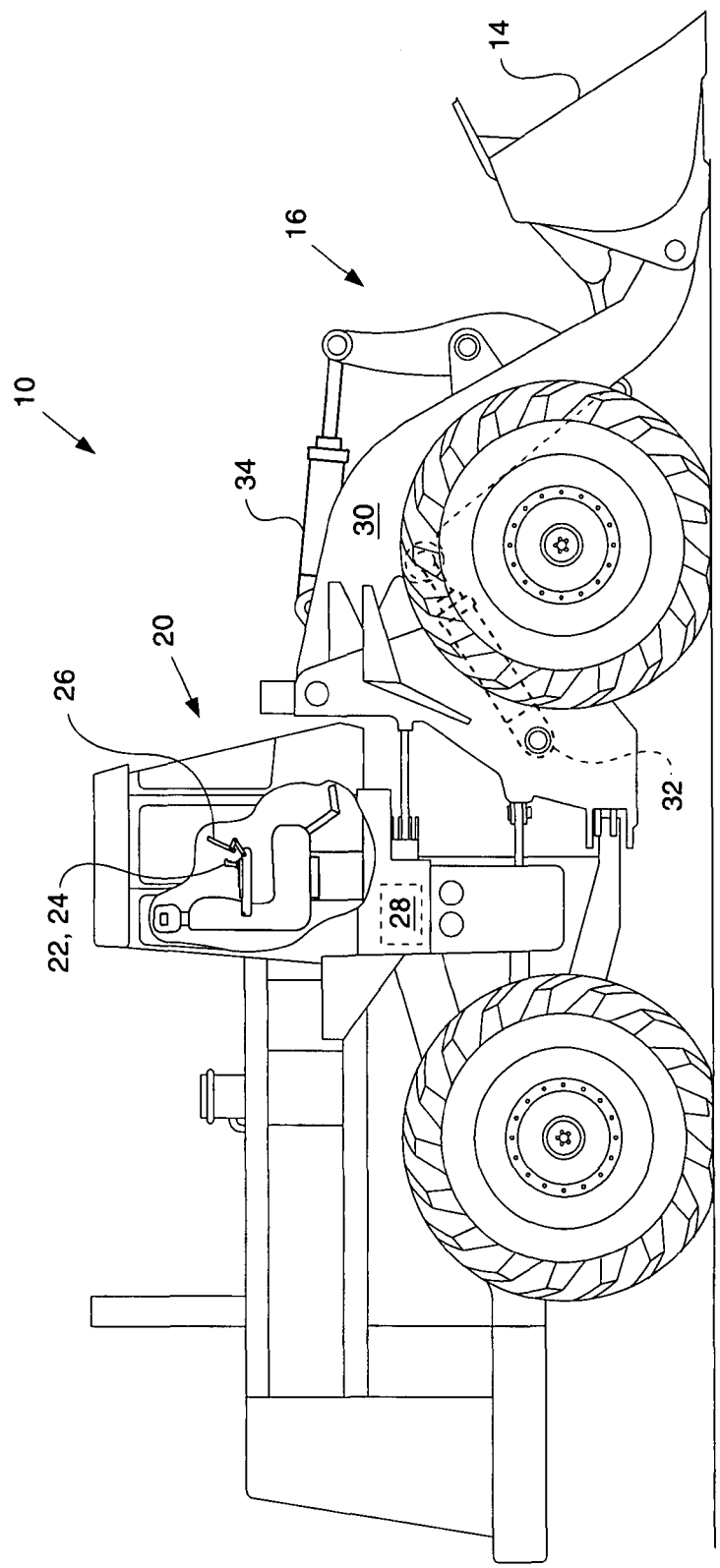
FIG. 1 shows a diagrammatic illustration of a machine where one embodiment of the present disclosure may be employed.

FIG. 1 shows a diagrammatic illustration of a machine 10 where one embodiment of the present disclosure may be employed. Although the machine 10 is shown as a wheel loader, the machine 10 may be any kind of mobile or stationary machine that generally has a need for data communications and power to be transmitted from one area on the machine 10 to another to enable the execution of an operation. For example, mobile machines may include wheel loaders, excavators, track type loaders, dump trucks, garbage trucks, marine propulsion systems, locomotives, etc. Stationary machines may include power generation systems, machining systems or other manufacturing tools and systems, etc.

The machine 10 displayed in FIG. 1 is shown having a variety of devices 60, including a power source (not shown), an implement 14, a lift mechanism 16, and an operator control station 20. The operator station 20 may include additional devices 60, such as a lift control device 22, a steering control device 24, and a display 26. The operator station 20, although shown here as being on the machine 10, may be on the machine itself or at a location remote from the machine 10. The machine 10 may also include at least one controller 28, the controller also being a type of device 60. The controller 28 preferably includes programming specific to the machine 10, but it should be appreciated that various aspects of the controller 28 may be common to all machines 10. The controller 28 may be microprocessor based, as is known in the art. In addition, the controller 28 may be one of a number of controllers for controlling different functions. The controller 28 may also control subservient controllers.

The machine 10 may have an implement 14 controllably attached to the machine 10 by the lift mechanism 16. The lift mechanism 16 may include a lift linkage 30 that may be hydraulically actuated by one or more hydraulic cylinders. In particular, lift linkage 30 and implement 14 may be controlled by lift cylinder 32 and tilt cylinder 34 to lift and tilt the implement 14.

Figure 2:
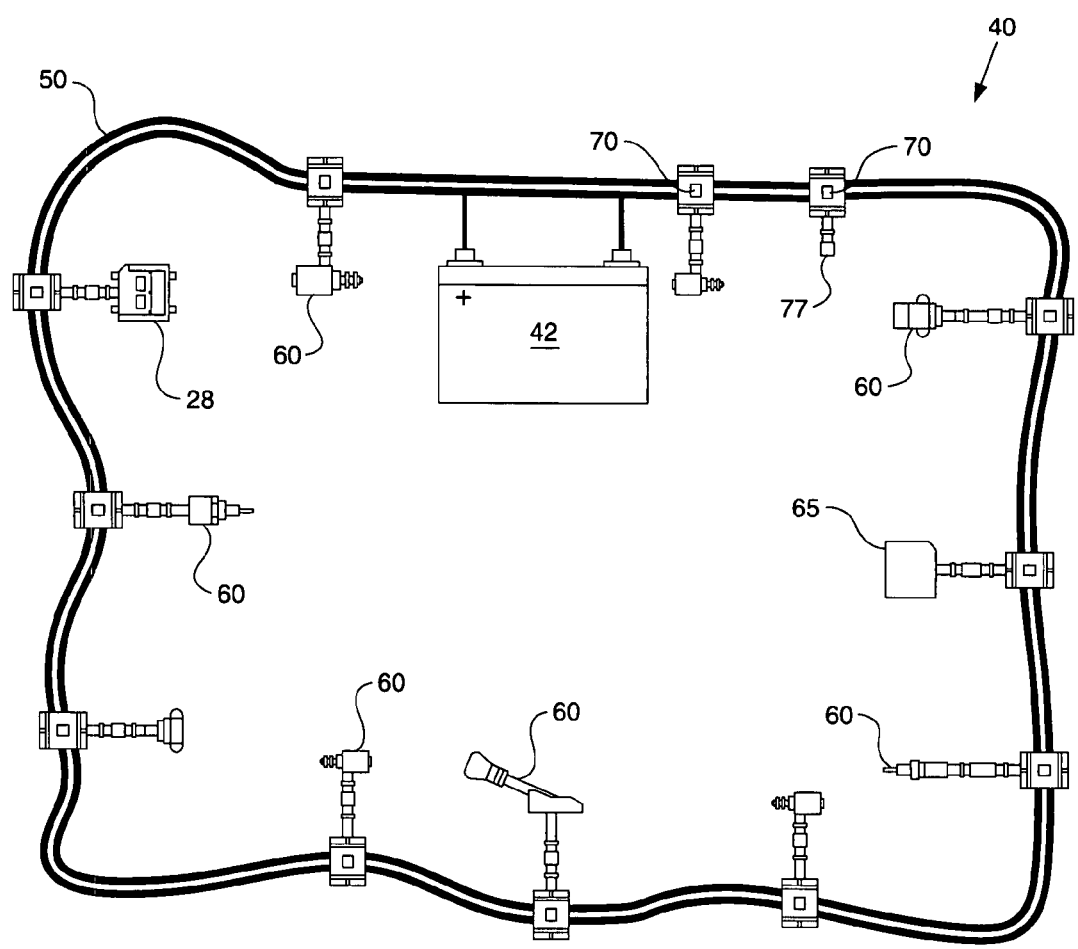
FIG. 2 shows diagrammatically a power and data delivery system according to one embodiment of the present disclosure.

FIG. 2 shows diagrammatically a power and data delivery system 40 according to one embodiment of the present disclosure. The power and data delivery system 40 is arranged throughout the machine 10 and is connected to a power supply 42. The power and data delivery system 40 may include conductors such as a two-wire configuration, but may also include other configurations including, but not limited to, a one-wire configuration, for example with a common chassis ground. The power and data delivery system 40 may be arranged such that a conductor 50 is operably connected to all devices 60 requiring communication with the controller 28 or with other devices 60, and also requiring power from the power supply 42. The transfer of data and power preferably occurs over the same conductor 50. In addition to the devices 60 mentioned above, devices 60 may include, but are not limited to, solenoids, sensors, relays, throttle shifters, lights, alarms, and any other electrical device that may be present on the machine 10 or other machines. Devices 60 are operably connected to the conductor 50 via smart connectors 70. A smart connector 70 may also be characterized as a node, a processing node, a tap, and the like. Each device 60 may have its own smart connector 70, as shown in FIG. 2.

Alternatively, the power and data delivery system 40 may be arranged and utilized on a portion of the machine 10. This may occur where new devices 60 are added to a machine 10 already having a wiring setup, such as a wiring harness. Furthermore, multiple systems 40 may be used on a machine 10. For example, a first system may be installed for the operator station of the machine 10 while a second system 40 may be installed for the rest of the machine 10. Similarly, separate systems 40 may also be used for cooling systems, implements, and the like. The systems 40 may then be connected to one another via smart connectors 70.

Figure 3:
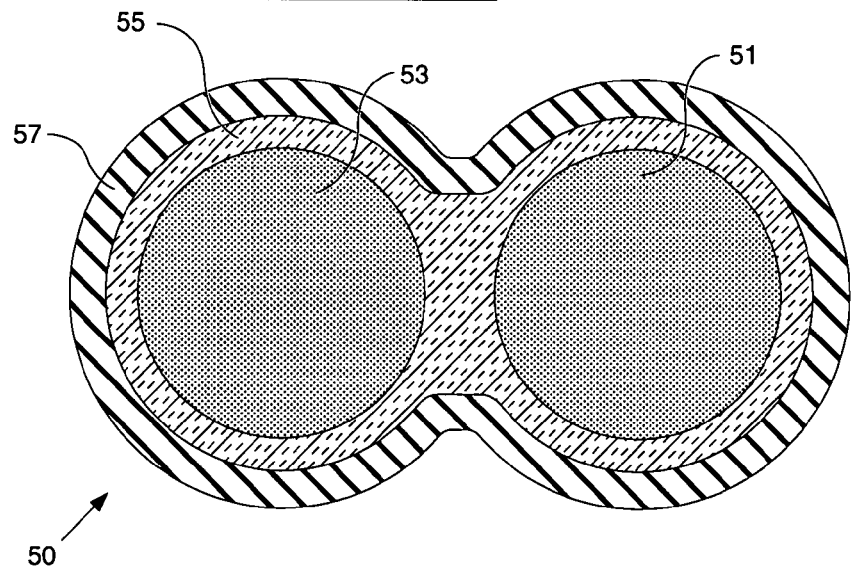
FIG. 3 is a cross section diagram of a conductor according to one embodiment of the present disclosure.

FIG. 3 is a cross section of the conductor 50 according to one embodiment of the present invention. The conductor 50 comprises a positive line 51 and a negative line 53. Each of the positive and negative lines 51, 53 may be made from a finely stranded material, such as copper, aluminum, or other material. The positive and negative lines 51, 53 may be disposed within an insulation 55 that electrically insulates and protectively surrounds the positive and negative lines 51, 53. Sheathing 57 may be arranged about the insulation 55 for an additional layer of protection from abrasion as well as to prevent electro-magnetic interference (EMI) or emissions. Alternatively, the insulation 55 and sheathing 57 may be integrated as one component.

Figure 4:
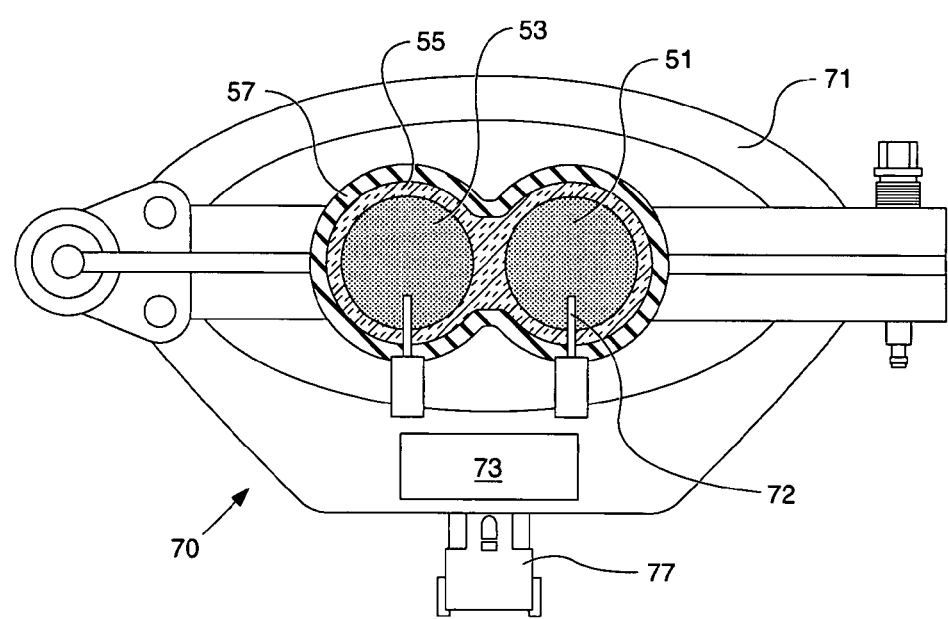
FIG. 4 is a cross section view of a smart connector plugged into the conductor according to one embodiment of the present disclosure.

FIG. 4 is a cross section view of a smart connector 70 connected to the conductor 50 according to one embodiment of the present disclosure. The smart connector 70 may comprise a housing 71, prongs 72, a smart chip 73, and a device connector 77. The smart connector 70 may be connected to the conductor 50 at any location along the conductor 50 where it may be desired to connect a device 60. The connection of a smart connector 70 may occur during assembly of the machine 10 or at a later time, such as when a new device 60 may be added.

Connection of the smart connector 70 to the power and data conductor 50 may require that the smart connector 70 have at least one prong 72 that may penetrate the insulation 55 and sheathing 57 of the conductor 50 and independently contact a corresponding at least one of the positive and/or negative lines 51, 53. As shown in FIG. 4, there are 2 prongs 72, one prong 72 to contact the positive line 51 and one prong 72 to contact the negative line 52.

Ensuring a proper connection may include techniques such as clearly marking the conductor 50 and the prongs 72 with positive or negative markings, color codes or other types of markings so that the correct polarity between the contacts is made. In one embodiment of the disclosure, the prongs 72 may assume the shape of knife-like structures with a predetermined curvature for easier penetration into the conductor 50. The use of finely stranded lines in the conductor 50 allows the prongs 72 to readily penetrate into the positive and negative lines 51, 53 for enhanced electrical contact. The housing 71 may also allow for a predetermined offset of the prongs 72 from the conductor 50 such that assembly of the housing 71 about the conductor 50 will ensure a proper depth of penetration of the prongs 72 into the conductor 50.

Although the prongs 72 may be required to penetrate the sheathing 57 and insulation 55, various techniques may be used to establish a good connection. To prevent electrical continuity between prongs 72, it may be desired to coat the prongs 72 such that only the part of the prong 72 penetrating the conductor 50 into the stranded portion is conductive. This may be done using coatings and the like about the part of the prong 72 that may be in contact with the sheathing 57 or insulation 55. For example, a coating may be applied to portions of the prongs 72 that may be in contact with the sheathing 57 or insulation 55 or a coating may be applied to all but the end of the prongs 72. The coating should be a material that provides electrical insulation.

The smart connector 70 may be configured such that a sealant, e.g., a gel-like substance, may be located on the smart connector 70 and released during the connection process to completely seal the connection from the environment as the housing 71 closes about the conductor 50. The sealant may also be capable of coating portions of the prongs 72 as they penetrate into conductor 50 thereby providing insulation of a portion of each prong 72. Alternatively, the sealant may be located within the conductor 50, for example between the sheathing 57 and the insulation 55. If the sheathing 57 becomes exposed to the environment, the sealant at that location may harden and thus provide a barrier to maintain the integrity of the conductor 50. Using a sealant that may be of a material that hardens upon exposure to air may also prevent physical damage in case the sheathing 57 becomes frayed.

Design of the conductor 50 and the smart connector 70 may also allow for various configurations of the conductor 50 within the housing 71. The conductor 50 and the housing 71 may be configured such that the positive line 51 may only fit on one side of the housing 71 and the negative line 53 may only fit on the other side of the housing 71, thus allowing only for a proper polarity connection. Alternatively, the housing 71 may be configured such that connection to the conductor 50 may be made with the positive and negative lines 51, 53 contacting either prong 72. A contact device 74 may be located on the smart connector 70 to sense voltage polarity and may either provide an indication of a correctly polarized connection or reverse the polarity if not correct.

The smart connector 70 may be secured to the conductor 50 in one of a number of ways, including, but not limited to, adhesive, screws, bolts, clips, and the like. Securing the housing 71 to the conductor 50 by one of the above methods preferably maintains adequate connection in harsh environments.

Properly securing the housing 71 about the conductor 50 may equalize the compressive forces on the finely stranded wire bundle and may result in an overall stiffer region of the conductor 50. Having a stiffer region where the prongs 72 penetrate the conductor 50 may result in a reduction of fretting corrosion between the prongs and the finely stranded wire bundle of the conductor 50.

FIG. 5a is a perspective view of a smart connector 70 according to another embodiment of the present disclosure. This embodiment of the smart connector 70 may comprise a connector top housing 120 and a connector base housing 150 and may be connected at any location along the conductor 50 where it may be desired to connect a device. The connection may occur during assembly of the machine 10 or at a later time, such as when a new device 60 may be added.

The conductor 50 is shown extending from top housing first and second ends 122,124 and corresponding base housing first and second ends 142,144. The conductor may be configured to extend along a longitudinal axis 115. The top and base housings 120,150 may also be configured to extend along this same longitudinal axis 115. A connector interface or a device connector 77 is shown protruding from the top housing 150 transverse the longitudinal axis 115 of the conductor 50. Although a single device connector 77 is shown, there may be additional device connectors 77 extending off the smart connector 70 to accommodate additional connections to the power and data conductor 50. The device connector 77 may also be configured to receive at least one connector pin 145 that may also extend transverse the longitudinal axis 115 of the conductor 50. While typical device connectors 77 may have three pin connectors 145, the total number of connector pins 145 may be more or less than this.

The smart connector 70 may also be secured such that the top and base housings 120,150 provide a seal about the conductor 50. Although FIG. 5a depicts the top and base housings 120,150 being attached utilizing a plurality of mating clips, the top and base housings 120,150 may be attached in one of a number of ways, including, but not limited to, any of the aforementioned methods.

FIG. 5b is a perspective view of the smart connector in FIG. 5a with the connector top housing removed showing a circuit board 130, a potting layer 140, and a top housing seal 125 that may be found in the top housing 120. The circuit board 130, potting layer 140, and top housing seal 125 may all be part of the top housing 120 such that the top housing 120 and base housing 150 may be connected in a single step. The top housing seal 125 may be seated in a groove (not shown) in the top housing 120. Additionally, a portion of the area between the potting layer 140 and the top housing 120 may be filled with a potting material to surround the circuit board 130. The potting material may be any material known in the art for use as a potting material. The potting layer 140 may then provide the separation between the top housing 120 and the base housing 150.

The circuit board 130 may have prong contacts 131 positioned to receive first and second contact prongs 165,175 through the potting layer 140. At least one connector pin 145 may also be attached to the circuit board and may be positioned to be received by the device connector 77. Locating apertures 133 may be configured in the circuit board 130 for receiving locating pins 142 from the potting layer 140 and locating pins (not shown) from the top housing 120. A potting aperture 134 may be located in the circuit board 130 for possible injection of the potting material.

A variety of circuit boards 130 may or may not be used depending on the complexity of the smart connector 70. The circuit board 130 may also contain a number of devices, such as, but not limited to, processors, transmitters, receivers, contact devices, etc. For mere electrical conveyance, a circuit board 130 may not be used. For more complex applications, the circuit board 130 may have heat generating devices (not shown) that may require heat sink contacts 195 or other electronics to conductively transfer heat to heat sinks 190 mounted external to the top housing 120.

Figure 5C:
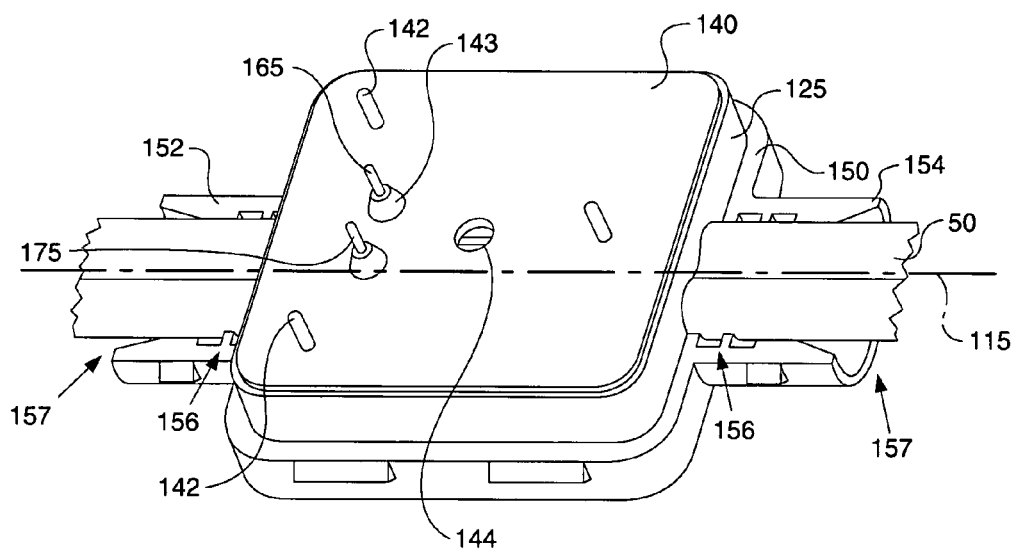
FIG. 5c is a perspective view of the smart connector in FIG. 5a with a connector top housing and a circuit board removed.

FIG. 5c is a perspective view of the smart connector 70 in FIG. 5a with the connector top housing 120 and a circuit board 130 removed showing the potting layer 140. The potting layer 140 may have locating pins 142 that may be received by locating apertures 133 in the circuit board 140. The potting layer 140 may also have a potting aperture 144 that lines up with the circuit board potting aperture 134 for injection of the potting material. The potting layer 140 may also have prong guides 143 to receive contact prongs 165,175 through the potting layer 140.

Figure 5D:
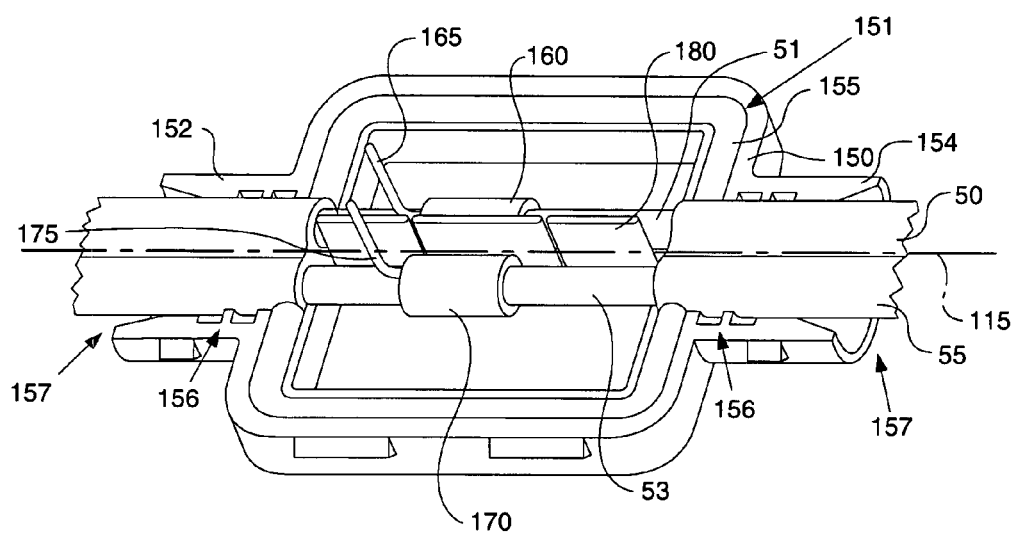
FIG. 5d is a perspective view of the smart connector in FIG. 5a with a connector top housing, circuit board and potting layer removed.

FIG. 5d is a perspective view of the smart connector 70 in FIG. 5a with the connector top housing 120, circuit board 130, and potting layer 140 removed showing the conductor 50 arranged along the longitudinal axis 115 of the smart connector 70. The base housing 150 is shown to have first and second ends 152,154. Each of the first and second ends 152,154 is shown to have a base conductor channel to receive and locate the conductor 50. The base conductor channels may have a base clamping portion 156 that may engage the insulation 55 of the conductor 50. Although the base clamping portion 156 is shown here as ribs or risers, the base clamping portion 156 may be configured using any of a number of ways known in the art to engage the conductor 50. Each of the base conductor channels in the first and second ends 152,154 may also be outwardly flared about the conductor 50. The base housing 150 may have a periphery groove to receive a base housing seal 155 to engage the conductor 50.

As is shown in FIG. 5d, a portion of the insulation 55 has been removed to expose the positive and negative lines 51,53 of the conductor 50. Removal of the insulation 55 and any other possible sheathing may be accomplished in any of a number of ways. A conductor contact 160,170 may be attached to each corresponding line 51,53 of the conductor in any of a number of ways, such as crimping, welding, soldering, and the like. Each conductor contact 160,170 may have a corresponding prong 165,175 extending transverse the longitudinal axis 115. A conductor partition 180 may positioned in the base housing 150 between the positive and negative lines 51,53 of the conductor 50.

FIG. 5e is a perspective view of the smart connector 70 of FIG. 5a with the connector base housing 120 removed. The top housing 120 is shown to have first and second ends 122, 124. Each of the first and second ends 122,124 is shown to have a top conductor channel to receive and locate the conductor 50. The top conductor channels may have a top clamping portion 126 that may engage the insulation 55 of the conductor 50. The top conductor channels and clamping portions 126 may be configured to correspond to the base conductor channels and clamping portions 156. Each of the top conductor channels in the first and second ends 122,124 may also be outwardly flared about the conductor 50 corresponding to the base conductor first and second ends 152,154. The top housing 120 may also have a top housing seal 125 in a periphery groove corresponding to the base housing seal 155 and may be configured to engage the base housing seal 155 and the conductor 50.

FIGS. 5f and 5g are respective cross section diagrams of the smart connector 70 of FIG. 5a parallel to and perpendicular to longitudinal axis 115 of the conductor 50. A connector mount 200 is shown on a surface of the base housing 150. The smart connector 70 may be mounted to a machine or other structure in one of a number of ways in the art, including by adhesive, straps, mechanical means, and the like. This may depend on the materials used to construct the top and base housings 120,150 of the smart connector 70. In this embodiment, an adapter (not shown) may be attached to a portion of the machine 10 or other structure in any one of the above listed ways. The connector mount 200 may engage the adapter and maintain its location relative to the adapter.

The smart connector 70 may connect to and make electrical contact with a device 60 by way of a device connector 77. The device connector 77 may be a pigtail connector or some other such connector suitable for the task. Alternatively, the device 60 may be connected to a smart chip 73a directly without any intermediate connector.

Figure 6A:
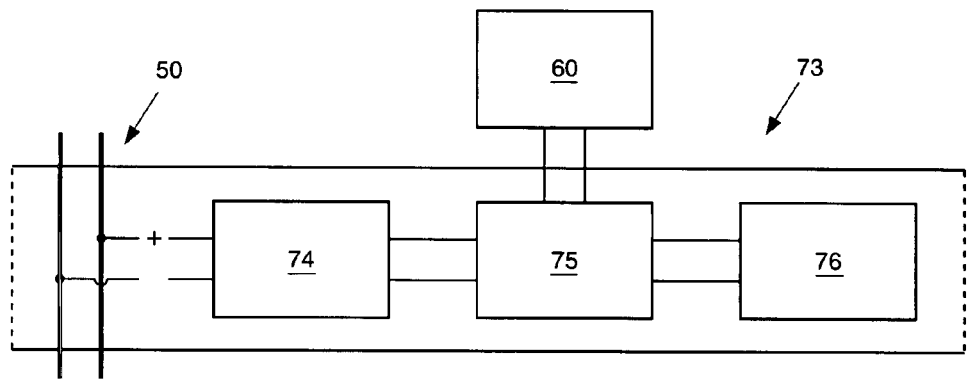
FIG. 6a is a block diagram of a smart chip connected to the conductor according to one embodiment of the present disclosure.

FIG. 6a is a block diagram of a smart chip 73 connected to the conductor according to one embodiment of the present disclosure. The smart chip 73 may comprise an optional contact device 74, a receiver/transmitter 75 and a processor 76.

The processor 76 may be programmed from a controller 28 through the receiver/transmitter 75, may be pre-programmed to recognize connection to a new device 60, may be programmed from the device 60 itself, or may be programmed utilizing any other device 60 having programming capability. A message may then be sent to a display 26 notifying the operator of a changed condition based on the programming. The changed condition may then be approved or denied based on an operator input or a predetermined system protocol. The smart connector 70 may then be enabled to communicate information through the conductor 50.

The smart connector 70 may transmit commands, inquiries, or other data to the device 60, and also receive data from the device 60. The smart connector 70 may then communicate by way of the conductor 50 to other smart connectors 70, devices 60, or the controller 28. When a communication is sent over the conductor 50, the communication may be available for all smart connectors 70 to review. However, only the smart connector 70 to which the communication is addressed will normally utilize the information. Although the signal may attenuate over time, the communication may remain on the conductor 50 indefinitely until filtered out by a signal attenuation device 65. The signal attenuation device 65 may filter or impede communications over a period of time such that the communication may be attenuated to an insignificant value, leaving the bandwidth of the conductor 50 available for new communications.

The smart connector 70 or the smart chip 73 may be available as off the shelf products. Thus, the smart connector 70, by use of standard components, may be a generic, interchangeable product.

The smart connector 70 may have built-in current limiting capabilities. The processor 76 may be programmed such that it may detect the current flowing to the device 60 and determine if the current is within tolerance. If the current is not within tolerance, the processor 76 may then stop or limit current flow to the device 60. The processor 76 may also send an out of tolerance message to an operator. Alternative means for limiting current flow may be used, such as resistors, capacitors, transistors, fuses, breakers, shunt devices, and the like.

The processor 76 may be programmed such that it may send communications over the conductor 50 on a predetermined frequency. This predetermined frequency may be operator selected based on a desired frequency, may be selected based on available bandwidth, or may be selected based on some other criteria, such as system condition, location, available communication means, regulated restrictions, and the like. Alternatively, the communication may be sent in multiple redundant packets using a plurality of frequencies or a plurality of communication protocols.

While the smart connector 70 is shown to contain certain components, the smart connectors 70 may all be configured consistently across the conductor 50 or may be configured in different ways for the different types of devices 60 being connected. In a basic situation, the smart connector 70 may be configured to connect to devices 60 that do not require a data stream from the conductor 50. The smart connector 70, or tap, may be configured just with battery positive and battery negative wires to convey only power. In situations where devices 60 are being connected having sensor outputs, the smart connector 70 may contain a processor 76 and hardware to receive power and interpret messages representative of the sensor output onto the conductor 50. Examples of devices 60 having sensor outputs may include temperature sensors, brake pedal sensors, throttle pedal sensors, and the like.

The smart connector 70 may also be configured to connect devices 60 that have a need for driven DC current, such as lamps, solenoids, and the like. The smart connector 70 in this instance may include a processor 76, hardware to receive power and interpret messages from the conductor 50, and driver output hardware (not shown) to supply a requisite amount of power to driven devices 60.

Furthermore, the smart connector 70 may be configured to connect devices 60 that have a communications output, such as a gage cluster, keypad, and the like. This smart connector 70 configuration may include a processor 76 and hardware to interpret data between communication protocols of connected devices 60 and the communication protocol of the system 40. This setup may allow the devices 60 to effectively communicate and interact with the system 40.

Figure 6B:
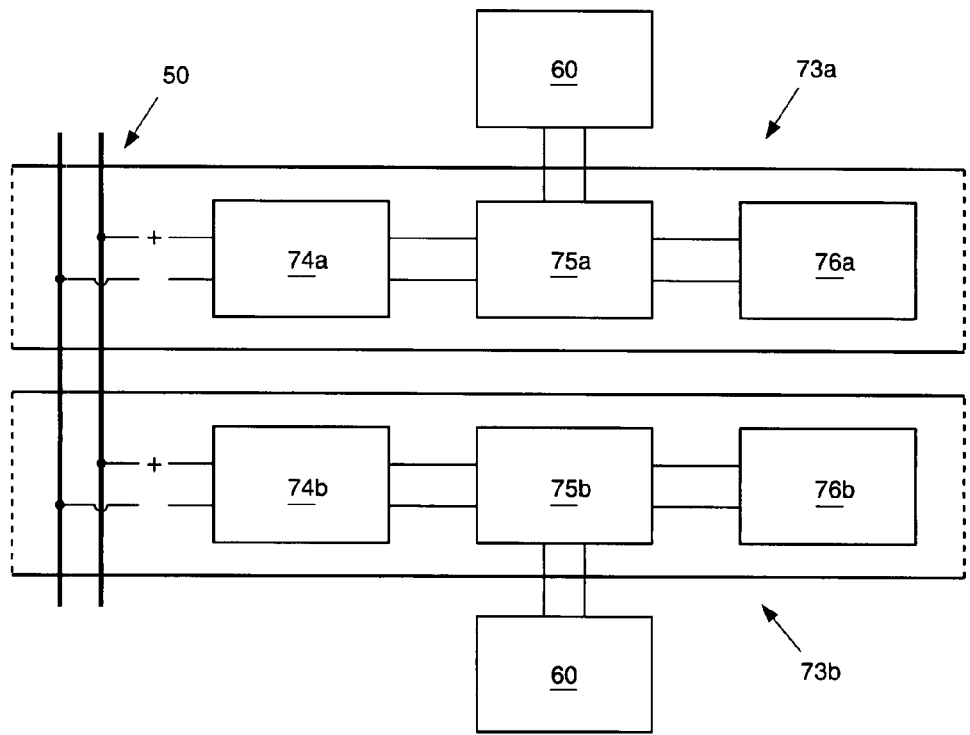
FIG. 6b is a block diagram of two smart chips connected to the conductor according to one embodiment of the present disclosure.

FIG. 6b is a block diagram of two smart chips 73a, 73b connected to the conductor 50 according to one embodiment of the present disclosure. A first processor 76a may send redundant packets to a second processor 76b. The second processor 76b receiving the redundant packets may compare the multiple communications for data integrity. The data may be considered completely and accurately delivered based on comparing the multiple communications with each other. For example, the communication may be sent redundantly over three separate frequencies, and a data match of at least two communications may indicate successful transmission. The number of required matches may depend on the type of data, the importance of the data, the speed required for data transfer, system conditions, external conditions, and the like. The second processor 76b, upon determining a successful transmission of data, may send a confirmation of data received. The confirmation may be sent to the first processor 76a or to a display 26 to provide notice to an operator. If the transmission of data is determined to be unsuccessful, i.e. the required number of matches is not received, the second processor 76b may notify either the first processor 76a, the operator, a designated source, or the like. In addition, the second processor 76b may ask for a re-transmission of the data. Because of either the lack of confirmation, a request for re-transmission, etc., the first processor 76a may recognize that the data is not being received by the second processor 76b and may then choose to send the data over different frequencies or in differing numbers of packets. This may continue until the data is received, the request is canceled, the operator is notified of the condition, and the like.

The display 26 may be configured to provide real-time, visual feedback on machine operating conditions. This may be used to ensure the best performance of the machine 10 and to assist in troubleshooting. The conductor 50 allows for multiple communication data links to be utilized in providing real-time performance and operating information while the machine 10 is in use. Alternatively, the information may be logged for future review. The display 26 may also be capable of showing one or more of the devices 60 that may be connected to the machine 10. This display 26 may also be configurable or re-configurable without changing out the hardware. Re-configuration may allow changes to the display 26 without utilizing additional current carrying devices.

Figure 7:
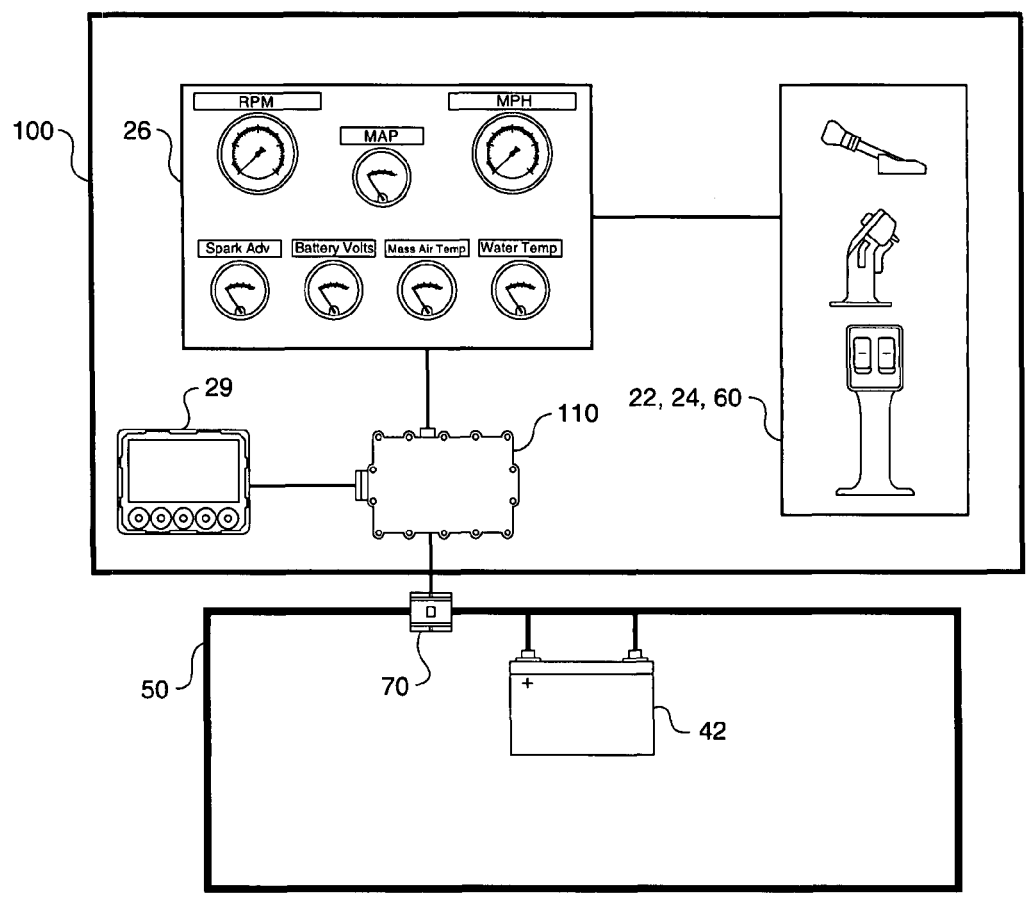
FIG. 7 shows diagrammatically a power and data delivery system according to another embodiment of the present disclosure.

FIG. 7 shows diagrammatically a power and data delivery system 40 according to another embodiment of the present disclosure. In this embodiment, one smart connector 70 on the conductor 50 is connected to an operator interface station 100. The operator interface station 100 comprises an operator interface controller 110, a display 26, operator control devices 22, 24, 60, and software loading interface 29.

The software loading interface 29 may be available to allow an operator to load software and configure or reconfigure new and existing devices 60. The software loading interface 29 may also indicate the software programmed in each smart connector 70. Alternatively, this may be done automatically as mentioned above as devices 60 are connected to the conductor 50.

The display 26 in this embodiment may comprise a virtual dashboard display. The virtual display 26 may be configured to display various machine operator conditions, including RPM, speeds, temperatures, battery information, fuel indications, and the like. The display 26 may come pre-programmed from the manufacturer and have various configurable setups to select from or may be configurable to the owner's or operator's preferences. A virtual dashboard display 26 may eliminate the need for dedicated inputs. This may provide for reduced electrical power consumption, less wiring, and a greater overall system capacity. The display 26 may also be all or partly software based. This allows for the monitoring or control equipment to be consistent across product lines and machines.

Figure 8:
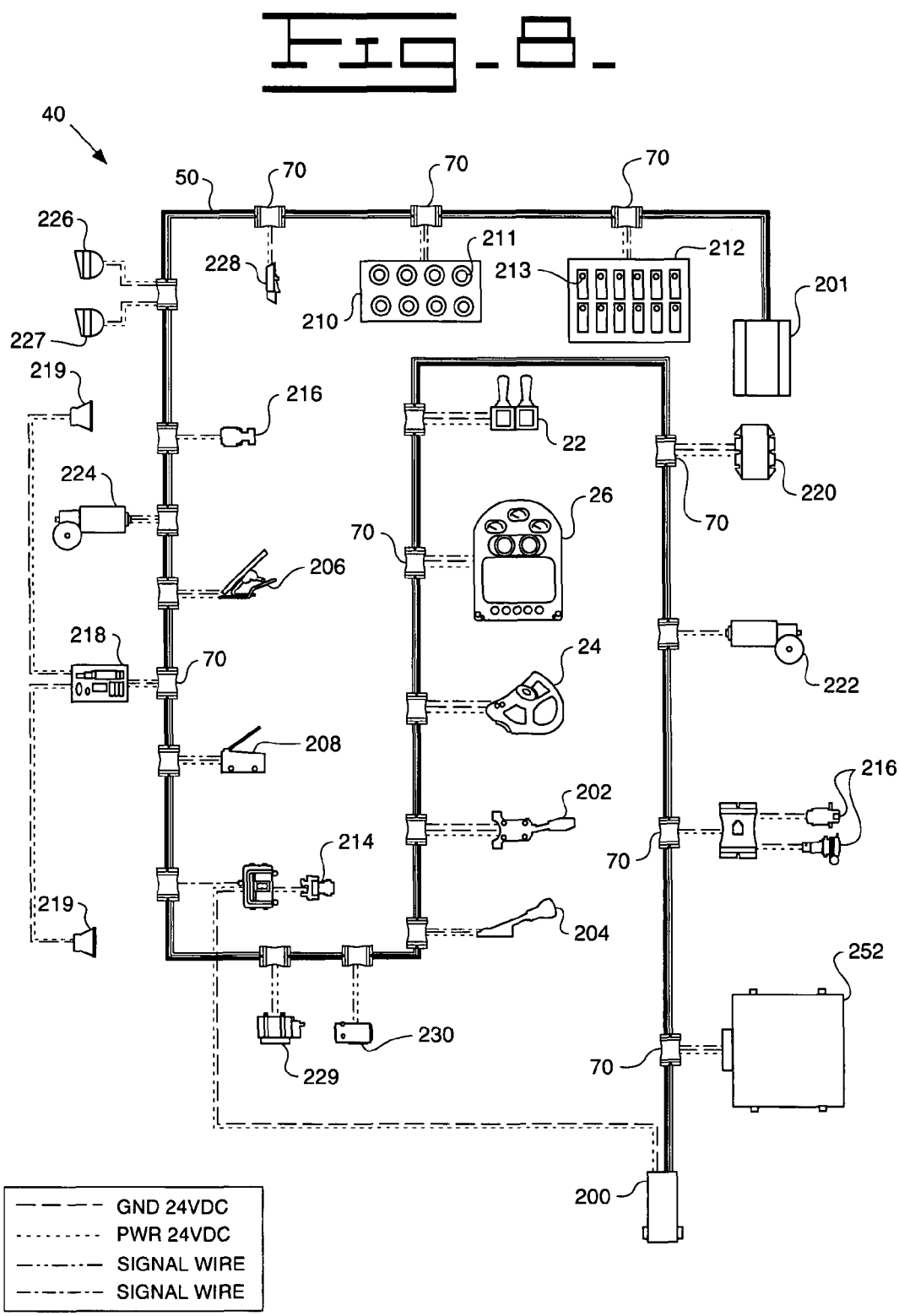
FIG. 8 shows diagrammatically a power and data delivery system according to another embodiment of the present disclosure.

FIG. 8 shows diagrammatically a power and data delivery system 40 according to another embodiment of the present disclosure. In this embodiment, the system 40 may be tailored to an operator control station 20 as shown in FIG. 1. The system 40 for the operator control station 20 may be separate from the rest of the machine 10 and may be connected to other sections of the machine 10 via an interface connector 200. The interface connector 200 may alternatively be connected to other sections of the machine, or other systems, via a smart connector 70. Alternatively, the system 40 for the operator control station 20 may be on a part of the conductor 50 that runs throughout the machine 10.

The system 40 may have an operating system electronic control module (ECM) 201. The ECM 201 may be directly connected to the conductor 50 or may be connected to the conductor 50 via a smart connector 70. The ECM 201 may control the operations of the system 40, such as communications, or messages, between smart connectors 70, and the like. Alternatively, the operation of the system 40 may distributed for processing among the smart connectors 70 and there may be no ECM 201 for the system 40.

The system 40 may have a number of devices 60 connected to the conductor 50 at a corresponding smart connector 70. The devices 60 may include operator interfaces, such as lift control device 22, steering control device 24, display 26, turn signal device 202, transmission select device 204, throttle pedal 206, brake pedal 208, rotary switch panel 210, switch panel 212, ignition switch 214, auxiliary outlets 216, radio 218, and the like. The rotary switch panel 210 and switch panel 212 may contain rotary switches 211 and switches 213 for controlling machine operations, such as auto dig, variable shift control, front and rear wipers, HVAC temperature select, quick coupling, heated mirrors, ride control, lights, and the like. The system 40 may include devices 60 such as communication device 220, front wiper motor 222, rear wiper motor 224, front floodlights 226, rear floodlights 227, dome light 228, air ride seat 229, seat heater 230, HVAC 232, and the like to perform operations associated with the operator control station 20.

The system 40 may be configured such that each smart connector 70 connected to the conductor 50 and each device 60 connected to a corresponding smart connector 70 is assigned a unique identifier. The unique identifier may be used to designate which smart connectors 70 and which devices 60 are supposed to receive a specific communication, or message, to perform a requested action generated in the system. The unique identifier may be node locked to the specific smart connectors 70 and devices 60 such that the same unique identifier is always associated with the same smart connector 70 and device 60. Alternatively, the unique identifier may be assigned new each time data signal communications are established in the system 40 depending on the detected smart connectors 70 and devices 60. In certain instances, there may not be any devices 60 connected to the smart connector 70. In this case, the devices may be null devices and there may not be a unique identifier. If a new device 60 and/or smart connector 70 is connected to the conductor 50, the smart connector 70 and/or device 60 may be automatically detected by the system 40 and a new unique identifier may automatically be assigned. It is also envisioned that this may be done manually.

The message generated in the system 40 may contain message content including the unique identifier and data associated with the requested action. The requested action, and subsequent message, may be generated by an operator input into the system 40, a request for data from one device 60 or smart connector 70 to another device 60 or smart connector 70, and the like. Examples of operator input to the system may include adjusting the lift control device 22, adjusting the steering control device 24, activating the turn signal device 202, adjusting the transmission select device 204, depressing the throttle pedal 206, depressing the brake pedal 208, adjusting a rotary switch 211 on the rotary switch panel 210, adjusting a switch 213 on the switch panel 212, turning the ignition switch 214, plugging into an auxiliary outlet 216, adjusting the radio 218, and the like.

Figure 9:
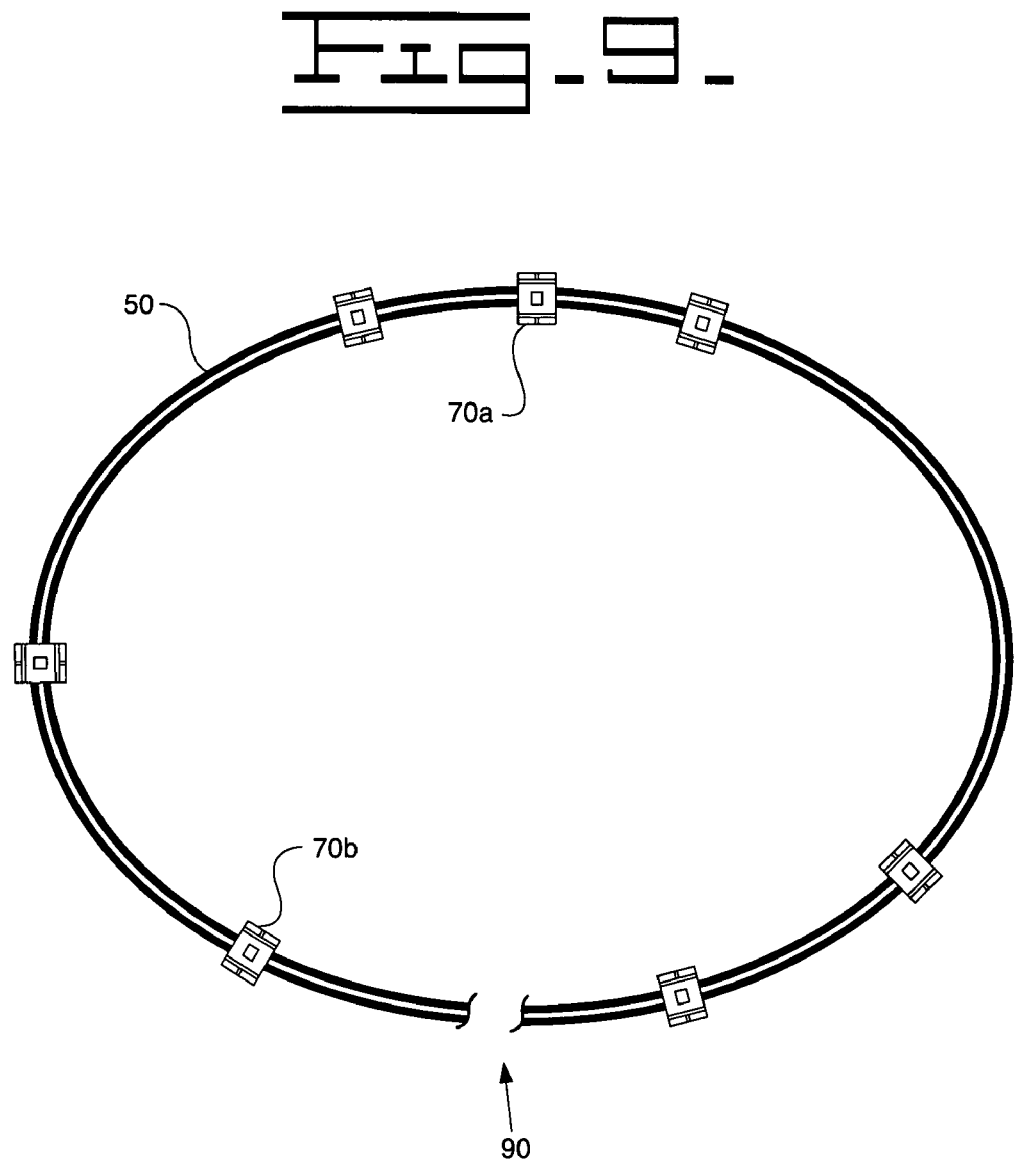
FIG. 9 shows diagrammatically a power and data delivery system according to another embodiment of the present disclosure

FIG. 9 shows diagrammatically a power and data delivery system 40 according to another embodiment of the present disclosure. Because the conductor 50 may be configured in a loop, a first smart connector 70a may transmit data on the conductor 50 to a second smart connector 70b that will travel in both directions from the first smart connector 70A. If a break 90 occurs in the conductor 50, the signal will only continue on the conductor until it reaches the break 90, at which time the signal will become fully attenuated. However, because of the loop configuration, the signal will still be capable of reaching the second smart connector 70b should a break 90 occur. Furthermore, a diagnostic mode may be built into the power and data delivery system 40 to assist in determining when and where a break 90 may have occurred in the conductor 50. For example, each smart connector 70 along the conductor 50 may be prompted to acknowledge receipt of a test signal. Failure to acknowledge by any smart connector 70 may indicate a smart connector malfunction or a break in the conductor 50. Further such diagnostic inquiries may yield more specific information.

Figure 10:
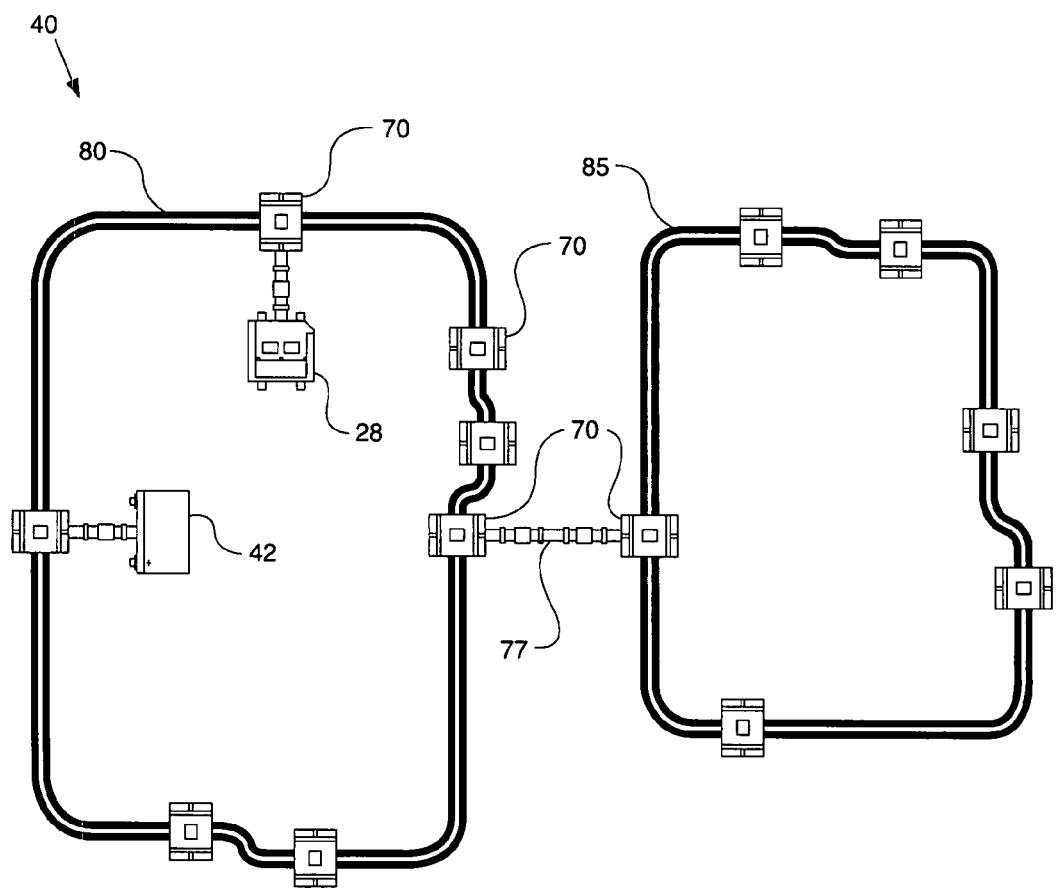
FIG. 10 shows diagrammatically a power and data delivery system according to another embodiment of the present disclosure.

FIG. 10 shows diagrammatically a power and data delivery system 40 according to another embodiment of the present disclosure. Although the conductor 50 as discussed and as shown in FIG. 1 is shown in a loop configuration, it may be arranged in other acceptable configurations known in the art such as spider or straight-line configurations. Alternatively, the configuration may be similar to that shown in FIG. 8. FIG. 8 shows a two-loop configuration wherein a first conductor 80 and a second conductor 85 are in communication with one another via smart connectors 70 on each loop connected by a device connector 77. In this embodiment, power and data may be transferred from the first conductor 80 to the second conductor 85 and thereby to the devices 60 on the second conductor 85. Alternatively, the second conductor 85 may also have a second power supply (not shown) to provide power to devices 60 on the second conductor 85. In this embodiment, the connection between the first and second conductors 80, 85 may be wired as described above or may be wireless using technologies such as, but not limited to, satellite or GPS, radio frequency (RF), cellular, and the like.

INDUSTRIAL APPLICABILITY

The power and data delivery system 40 comprises a power supply 42, a conductor 50, smart connectors 70, and devices 60. After the system 40 is arranged on a machine 10, smart connectors 70, generally configured within housings 71, may be attached to the conductor 50 in locations near where devices 60 may desirably be located. The devices 60 may be attached to the smart connectors 70 through device connectors 77 that may allow for the transfer of power and data from the conductor 50 to the devices 60 through the smart connectors 70.

The present disclosure provides an improved system and method for power and data delivery on a machine 10. This system and method negate the need for today's cumbersome wiring harnesses, and enable greatly reduced costs due to reductions in the number of components and standardization of many key parts. The smart connectors 70 may be used to distribute power in a daisy chain fashion, resulting in less wiring and negating the need for a central fuse block. Each smart connector 70 may contain a power protection circuit for each device 60 that may need power. Routing of the conductor 50 may be made substantially easier because of its reduced size and weight, thereby simplifying such tasks as making connections to devices, troubleshooting the system and devices, and adding devices as desired. This system and method makes upgrading older machines much easier and cost efficient. EMI may also be minimized due to the nature of the system configuration, i.e. the ability of having drivers close to driven devices, and the ability to send communications over multiple frequencies. The system 40 may also have the ability to perform additional functions. These functions may comprise power sharing, regeneration, high level diagnostics and prognostics, fuzzy logic based learning for performance optimization, site management, and other functions that, because of previous wiring configurations such as wiring harnesses, were too complex and burdensome to be done.

Figure 11:
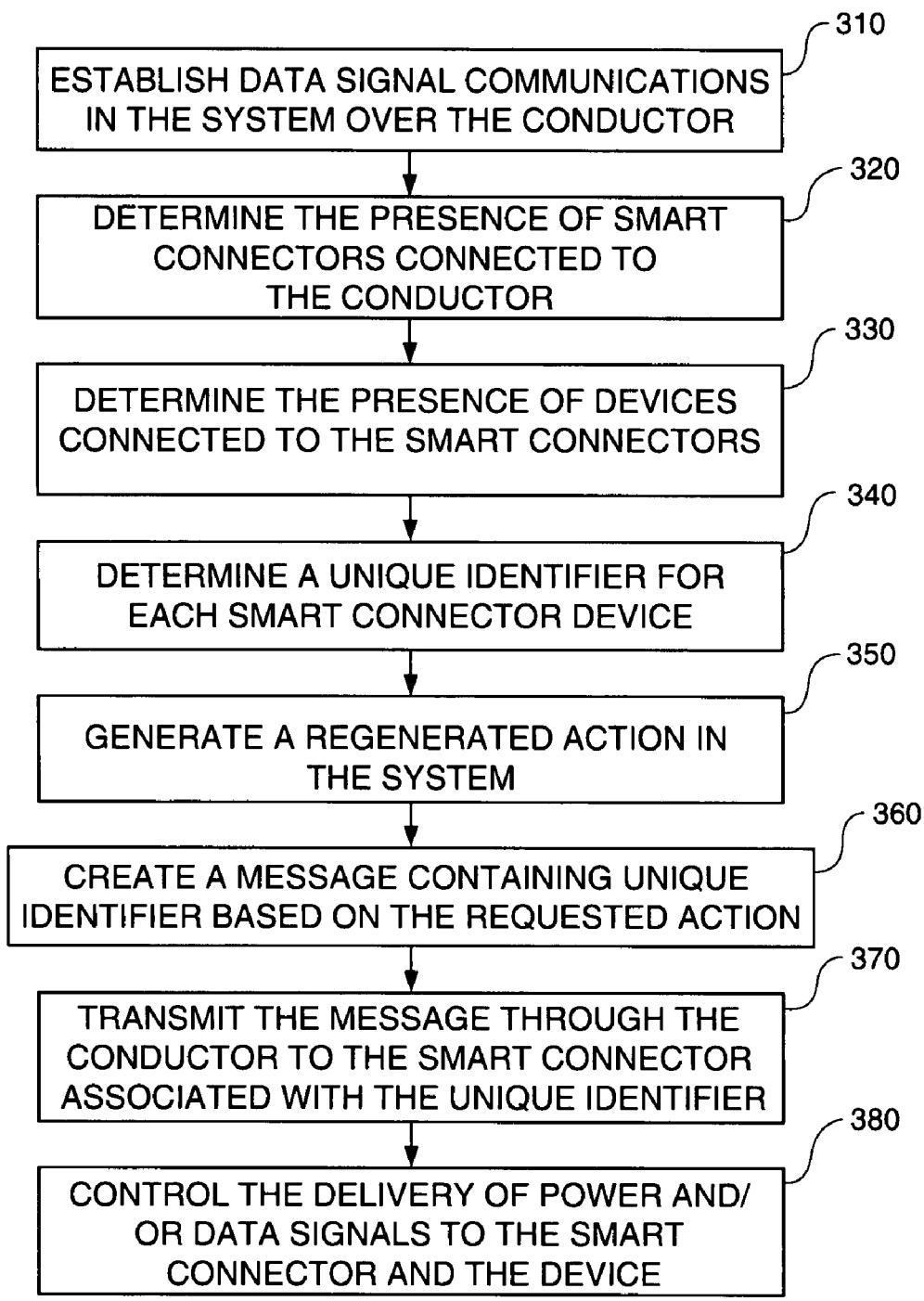
FIG. 11 is a flow diagram depicting steps of operation of a power and data delivery system according to one embodiment of the present disclosure.

Embodiments of the present disclosure are applicable to a number of machines 10 where both power and data may be routed to devices 60 connected to those machines 10. FIG. 11 is a flow diagram depicting steps of operation of a power and data delivery system 40 according to one embodiment of the present disclosure. Once data signal communications are established in the system 40 over the conductor 50 (step 310), the presence of smart connectors 70 and devices 60 connected to the smart connectors 70 may be determined (step 320 and 330). In systems 40 where there is a main operating system ECM 201, the ECM 201 may determine each smart connector 70 and device 60 connected to the conductor 50 by querying each smart connector 70 and device 60. In the case of distributed processing, each smart connector 70 with processing capability may send out a discovery request to identify all of the other smart connectors 70 and devices 60 on the system 40. Unique identifiers may then be determined for each smart connector 70 and device 60 (step 340).

As a requested action is generated within the system 40 (step 350), a message may be created containing the unique identifier based upon the requested action (step 360). The message may then be transmitted through the conductor 50 to the smart connector 70 associated with the unique identifier from the requested action (step 370). Upon receiving the message, the delivery of power and data signals may be controlled to the smart connector 70 and device 60 (step 380). Steps 350 through 380 may be repeated to cause a response message to be created and sent to the requesting smart connector 70. Furthermore, similar steps may be followed to create a message that may be sent to the operator interface 26 or to be logged by another device 60.

As an example of a particularly complex application of the present disclosure, a machine 10, such as a wheel loader, may be used to perform a lift function in which lift and tilt cylinders are controlled in coordination with one another for a process known as level lift. For example, as the machine 10 is used to pick up and drop off loads with the implement 14, various communications may occur within the system 40 to effectuate that movement. As the lift control device 22 is moved by the operator, the smart connector 70 for the lift control device 22 may create a series of messages corresponding to the actions of the lift control device 22. All messages may be first sent to the operating system ECM 201 if the ECM 201 is setup as the main processor for the system 40. After receiving each requested action, or message, the ECM 201 may then create messages directly having unique identifiers for specific devices 60 or may create messaged through a smart connector 70 for the ECM 201. Alternatively, the processing of the system 40 may be distributed such that the smart connectors 70 for the devices 60 may process all or some of the messages directly and create all or some of the messages for other smart connectors 70 that may not be routed through or generated by the ECM 201.

The message with a unique identifier for the lift cylinder 32 will be transmitted through the conductor 50 to the smart connector for the lift cylinder 32. Once the smart connector for the lift cylinder 32 receives the message, the smart connector 70 may then convey power and data signals corresponding to the requested action to cause the lift cylinder 32 to actuate. The smart connector 70 for the lift cylinder 32 may then create a second message with a second unique identifier for the ECM 201 and transmit the message through the conductor 50 that may confirm or deny actuation of the lift cylinder 32 according to the requested action.

The ECM 201 may also create a message having a unique identifier for a position sensor (not shown) associated with the lift cylinder 32. Based on the message received at the smart connector 70 for the position sensor (not shown), the position sensor may take a sensor reading of the lift cylinder 32 and generate a signal indicative of the reading. The smart connector 70 for the position sensor (not shown) may then create another message with the unique identifier for the ECM 201 and transmit that message through the conductor 50. The ECM 201 may then know the amount of extension of the lift cylinder 32 in relation to the tilt cylinder 34 and begin to create and transmit messages with a unique identifier for the tilt cylinder 34 to cause the tilt cylinder 34 to actuate.

The smart connector 70 for the tilt cylinder 34 may then receive the message and convey power and data signals to cause the tilt cylinder 34 to actuate according to the requested action. The smart connector 70 connected to the tilt cylinder 34 may create a message with the unique identifier for the ECM 201 and transmit the message through the conductor 50 that may confirm or deny actuation of the tilt cylinder 34 according to the requested action.

The ECM 201 may also create a message having a unique identifier for a position sensor (not shown) associated with the tilt cylinder 34. Based on the message received at the smart connector 70 for the position sensor (not shown), the position sensor may take a sensor reading of the tilt cylinder 34 and generate a signal indicative of the reading. The smart connector 70 for the position sensor (not shown) may then create another message with the unique identifier for the ECM 201 and transmit that message through the conductor 50. The ECM 201 may then know the amount of extension of the tilt cylinder 34 in relation to the lift cylinder 32.

The aforementioned communications may then continue to happen causing the implement 14 to maintain a level lift. Additional messages may be created by the ECM 201 for a display 26 such that the operator may know that the lift was level and operations are as requested. All of the above communications may be made nearly simultaneously and the messages for the movements may be traveling over the same conductor 50 at the same time. Furthermore, communications for other systems or subsystem of the machine 10, such as a cab control system, engine control system, and the like, may also be passing data across the conductor 50 simultaneously to the data communications for a level lift. It is envisioned that each system 40 may run independent of each other, i.e. have its own bus, or conductor 50 to possibly gain higher bandwidth. Furthermore, a main ECM (not shown), or processing system, may be connected to the independent systems 40 that may coordinate data communications among all of the systems 40 and well as the distribution of power among the systems 40.

A power and data delivery system 40 may also find application with a first conductor 80 found on a truck, i.e., a tractor of a tractor-trailer, and a second conductor 85 found on a trailer capable of operable connection to the truck. This application is similar to the embodiment of the present disclosure as shown in FIG. 10. The first conductor 80 may be capable of carrying power and data to a number of devices 60 on the truck including, but not limited to, lights, brakes, the engine, sensors, displays, etc. The second conductor 85 may be capable of carrying power and data to a number of devices 60 on the trailer including, but not limited to, controller 28, lights, brakes, GPS, climate control, etc.

Upon connection between the first and second conductors 80, 85, the controller 28 may be capable of recognizing that the smart connector 70 on the first conductor 80 is connected to another smart connector 70 on the second conductor 85. This connection may cause power and data to be carried to the second conductor 85 and allow for activation of the devices 60 on the second conductor 85. Alternatively, and as mentioned above, the connection between the first conductor 80 and the second conductor 85 may be done wirelessly. This may be done using GPS or RF electronics and may be based upon proximity of the trailer to the truck. Having GPS may also allow for additional functionality of the machines 10. GPS may assist in machine security as well as conformance with regulations based on machine location.

GPS and/or RF technology may allow for the presence of conductors 50 on separate mobile machines 10, such as two wheel loaders, wherein each wheel loader may have proximity alarms or warnings notifying the operators of another nearby machine 10. Having multiple conductors 50 may also simplify the arrangement of wiring on articulated machines where all wiring on a rear portion of the machine 10 must pass through the articulated joint. Separate conductors 50 may allow for a single device connector 77 between the conductor in the front portion and the rear portion of an articulated machine.

It will be apparent to those skilled in the art that various modifications and variations can be made in the system and method of the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents.

What is claimed is:

1. A power and data delivery system for a machine, comprising:
   a conductor for delivering power on a machine;
   a plurality of nodes, each connected to the conductor at a respective location along the conductor; and
   a plurality of devices, each connected to a corresponding node;
   wherein at least one node controls the delivery of power and data from the conductor to a smart connector connected to at least one corresponding connected device by way of a message containing a unique identifier, the message being conveyed through the conductor, and
   wherein the message is conveyed between at least one of:
      from the at least one corresponding connected device to an electronic control module operably associated with the conductor,
      from the electronic control module to the at least one corresponding connected device,
      from the at least one corresponding connected device to an additional connected device, and
      from the additional connected device to the at least one corresponding device,
   such that two-way communication of messages can be conducted between the electronic control module and the at least one corresponding connected device or between the at least one corresponding connected device and the additional connected device.

2. The power and data delivery system of claim 1, wherein the unique identifier designates at least one of a particular node and a corresponding device to receive the message.

3. The power and data delivery system of claim 2, wherein the particular node conveys a second message through the conductor, the second message containing a second unique identifier.

4. The power and data delivery system of claim 1, further including:
   a processor for controlling the flow of messages between the plurality of nodes.

5. The power and data delivery system of claim 4, wherein the processor is a part of at least one of the plurality of nodes.

6. The power and data delivery system of claim 4, wherein the processor is at least one of the plurality of nodes and the plurality of devices.

7. The power and data delivery system of claim 6, further including:
   a second processor to control the delivery of power and data to the plurality of devices based on the message, the second processor being a part of at least one of the plurality of nodes.

8. The power and data delivery system of claim 1, wherein the corresponding node is operable to transfer at least one of power and data signals between the conductor and the at least one connected device.

9. A power and data delivery system for a machine, comprising:
   a conductor for delivering power on a machine;
   a plurality of nodes, each connected to the conductor at a respective location along the conductor;
   a plurality of devices, at least one being connected to a corresponding node, the corresponding node for transferring at least one of power and data between the conductor and smart connector connected to the at least one connected device;
   an operator interface configured to convey a message through the conductor, the message containing a unique identifier for a particular node; and
   at least one processor configured to control the delivery of power and data based on the message;
   wherein the message is conveyed between the at least one processor and one of the plurality of devices or between any two of the plurality of devices.

10. The power and data delivery system of claim 9, wherein the plurality of devices include at least one of the operator interface and the processor.

11. The power and data delivery system of claim 9, wherein the processor is a part of at least one of the plurality of nodes.

12. The power and data delivery system of claim 9, wherein the processor is configured to control the flow of messages between the plurality of nodes.

13. The power and data delivery system of claim 9, further including:
   a second processor connected to the conductor, the second processor configured to control the flow of messages between the plurality of nodes.

14. The power and data delivery system of claim 12, at least one of the plurality of nodes further including: a second processor configured to control the delivery of power and data to the plurality of devices based on the message.

15. The power and data delivery system of claim 9, wherein the unique identifier designates at least one of the plurality of devices located at the particular node.

16. A method for controlling devices over a power and data delivery system on a machine, comprising:
   establishing data signal communications over a conductor configured to deliver power on a machine;
   determining the presence of at least one of a plurality of nodes connected to the conductor;
   determining the presence of at least one device connected to a corresponding one of the plurality of nodes;
   determining a unique identifier for at least one node; and
   controlling the delivery of power and data from the conductor to the node by way of a message containing the unique identifier that is conveyed through the conductor;
   wherein the message is conveyed between at least one of:
      from the at least one device to an electronic control module operably associated with the conductor,
      from the electronic control module to the at least one device, from the at least one device to an additional device connected to the conductor, and
      from the additional device to the at least one device,
   such that two-way communication of messages can be conducted between the electronic control module and the at least one device or between the at least one device and the additional device.

17. The method of claim 16, further including:
generating a requested action in the system;
creating a message based on the requested action, the message containing the unique identifier;
transmitting the message through the conductor; and
receiving the message at the node.

18. The method of claim 17, further including:
creating a second message based on a result of the requested action, the second message containing a second unique identifier for a second node;
transmitting the second message through the conductor; and
receiving the second message at the second node.

19. The method of claim 16, further including:
transmitting at least one of the power and data signals from the conductor to the at least one device through the corresponding node according to the requested action.

20. The method of claim 16, further including:
associating the unique identifier with at least one device connected to the node.

* * * * *